(12) United States Patent
Wang et al.

(10) Patent No.: US 11,601,043 B2
(45) Date of Patent: Mar. 7, 2023

(54) CONTROL METHOD AND CONTROL CIRCUIT FOR AN AC-DC POWER SUPPLY

(71) Applicant: Silergy Semiconductor Technology (Hangzhou) LTD, Hangzhou (CN)

(72) Inventors: Longqi Wang, Hangzhou (CN); Jianxin Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 118 days.

(21) Appl. No.: 17/022,270

(22) Filed: Sep. 16, 2020

(65) Prior Publication Data

US 2021/0091678 A1    Mar. 25, 2021

(30) Foreign Application Priority Data

Sep. 23, 2019  (CN) .......................... 201910899286.4

(51) Int. Cl.
*H02M 1/42* (2007.01)
*H02M 1/00* (2006.01)
*H02M 1/12* (2006.01)

(52) U.S. Cl.
CPC ....... *H02M 1/4225* (2013.01); *H02M 1/0025* (2021.05); *H02M 1/12* (2013.01); *H02M 1/4208* (2013.01)

(58) Field of Classification Search
CPC .... H02M 1/42; H02M 1/4208; H02M 1/4225; H02M 1/4291; H02M 1/12; H02M 1/0025

See application file for complete search history.

(56) References Cited

U.S. PATENT DOCUMENTS

| | | | |
|---|---|---|---|
| 6,075,716 A | 6/2000 | He et al. | |
| 6,191,565 B1* | 2/2001 | Lee | H02M 1/4225 323/222 |
| 6,385,057 B1 | 5/2002 | Barron | |
| 8,004,263 B2* | 8/2011 | Hirata | H02M 3/156 323/351 |
| 8,471,488 B1 | 6/2013 | Hopkins et al. | |
| 9,077,260 B2 | 7/2015 | Zhao et al. | |
| 9,124,169 B2 | 9/2015 | Garlow et al. | |
| 9,525,336 B2 | 12/2016 | Huang | |
| 10,224,809 B1* | 3/2019 | Agrawal | H02M 1/4208 |
| 2006/0119337 A1* | 6/2006 | Takahashi | G05F 1/70 323/282 |
| 2006/0245219 A1* | 11/2006 | Li | H02M 3/157 363/89 |
| 2009/0243398 A1 | 10/2009 | Yohanan et al. | |
| 2010/0148740 A1* | 6/2010 | Saitoh | H02M 3/1582 323/283 |

(Continued)

FOREIGN PATENT DOCUMENTS

CN            108093534 A       5/2008

*Primary Examiner* — Gustavo A Rosario-Benitez

(57) ABSTRACT

A control circuit for controlling an AC-DC power supply, can include: a pulse-width modulation (PWM) signal generating circuit configured to generate a PWM signal in accordance with a reference voltage and a current sampling signal representing an inductor current flowing through an inductor of the AC-DC power supply, and to control a power stage circuit of the AC-DC power supply in accordance with the PWM signal; and a reference voltage generating circuit configured to generate the reference voltage based on an input voltage of the AC-DC power supply.

18 Claims, 10 Drawing Sheets

(56) References Cited

U.S. PATENT DOCUMENTS

| | | | |
|---|---|---|---|
| 2012/0032619 A1* | 2/2012 | Kobayashi | B06B 1/045 |
| | | | 318/128 |
| 2012/0293144 A1* | 11/2012 | Chang | H02M 3/1588 |
| | | | 323/271 |
| 2012/0300517 A1* | 11/2012 | Zhang | H02M 1/4225 |
| | | | 363/84 |
| 2014/0354250 A1* | 12/2014 | Deng | H02M 3/157 |
| | | | 323/271 |
| 2015/0117074 A1* | 4/2015 | Miao | H02M 1/4225 |
| | | | 363/44 |
| 2015/0207398 A1 | 7/2015 | Proca | |
| 2015/0216007 A1 | 7/2015 | Ferrara et al. | |
| 2016/0111236 A1* | 4/2016 | Jin | H01H 37/32 |
| | | | 323/276 |
| 2016/0357202 A1* | 12/2016 | Ma | H02M 3/1584 |
| 2017/0179829 A1* | 6/2017 | Ramabhadran | H02M 1/4225 |
| 2018/0097445 A1* | 4/2018 | Miyamae | H02M 3/1563 |
| 2019/0386570 A1* | 12/2019 | Xi | H02M 1/0003 |
| 2020/0161969 A1* | 5/2020 | Li | H02M 3/156 |

* cited by examiner

CONTROL METHOD AND CONTROL CIRCUIT FOR AN AC-DC POWER SUPPLY

RELATED APPLICATIONS

This application claims the benefit of Chinese Patent Application No. 201910899286.4, filed on Sep. 23, 2019, which is incorporated herein by reference in its entirety.

FIELD OF THE INVENTION

The present invention generally relates to the field of power electronics, and more particularly to control circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Power factor (PF) and total harmonic distortion (THD) for various switching power supplies are important energy-saving factors, which may not only affect the conversion efficiency of the switching power supply, but can also pollute the power grid of the entire power supply system. Therefore, the requirements for power factor correction circuit (PFC) will become higher and higher. In general, a traditional approach for achieving high power factor involves adopting a constant on time (e.g., a fixed on time) control method. The main principle of the constant on time control approach is that on-time ton of the power transistor of the switching power supply is almost fixed during the entire power frequency cycle. In this way, the waveform of the input current obtained is not a sinusoidal half wave, but rather a shape close to an elliptical half wave, which may not satisfy high THD requirements.

Figure 1:
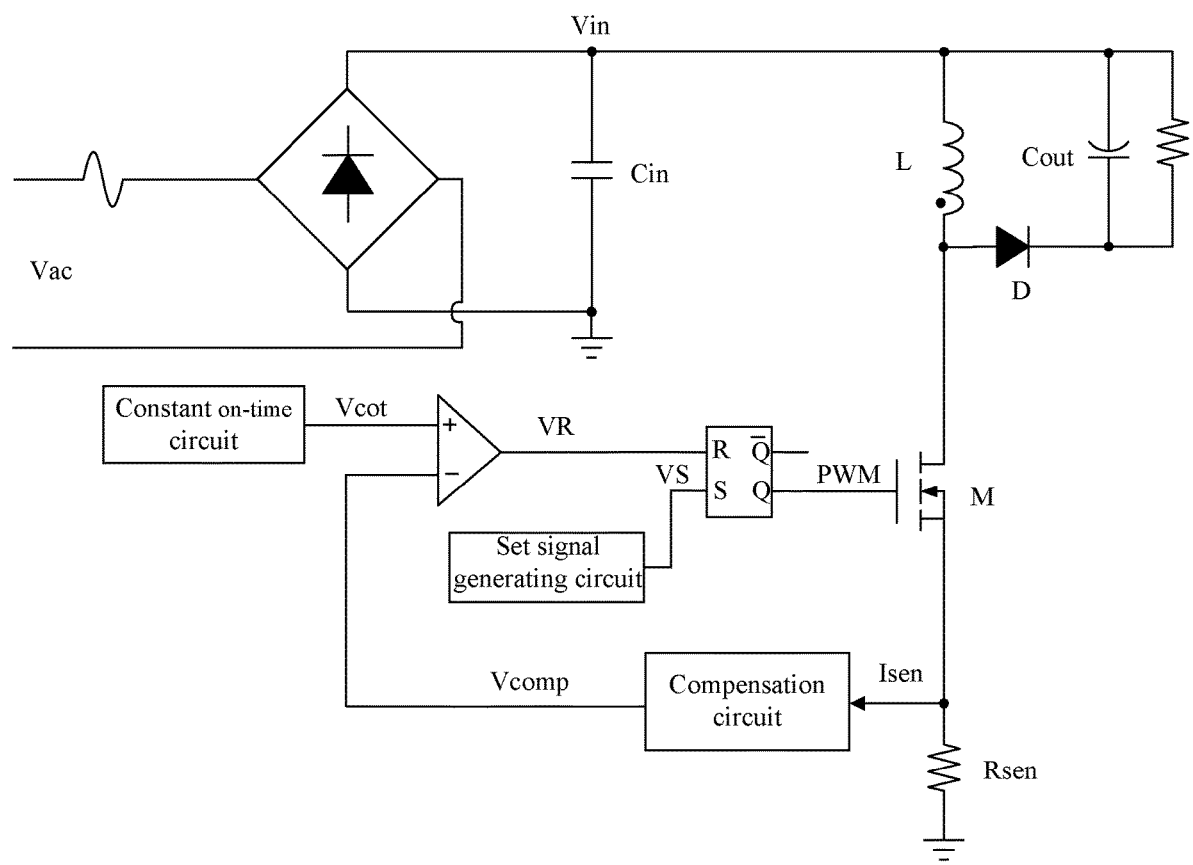
FIG. 1 shown is a schematic block diagram of an example power factor correction circuit.

Referring now to FIG. 1, shown is a schematic block diagram of an example power factor correction circuit. Taking the power stage circuit of the example power factor correction circuit as a buck-boost topology example, input current Iin(t) of the switching power supply with the constant on time control method can be expressed as follows in formula (1).

$$Iin(t) = \frac{ton}{ts} \cdot \frac{Vin(t) \cdot ton}{2 \cdot L_m} \qquad (1)$$
$$= \frac{Vout}{Vin(t) + Vout} \cdot \frac{Vin(t) \cdot ton}{2 \cdot Lm}$$

Figure 2:
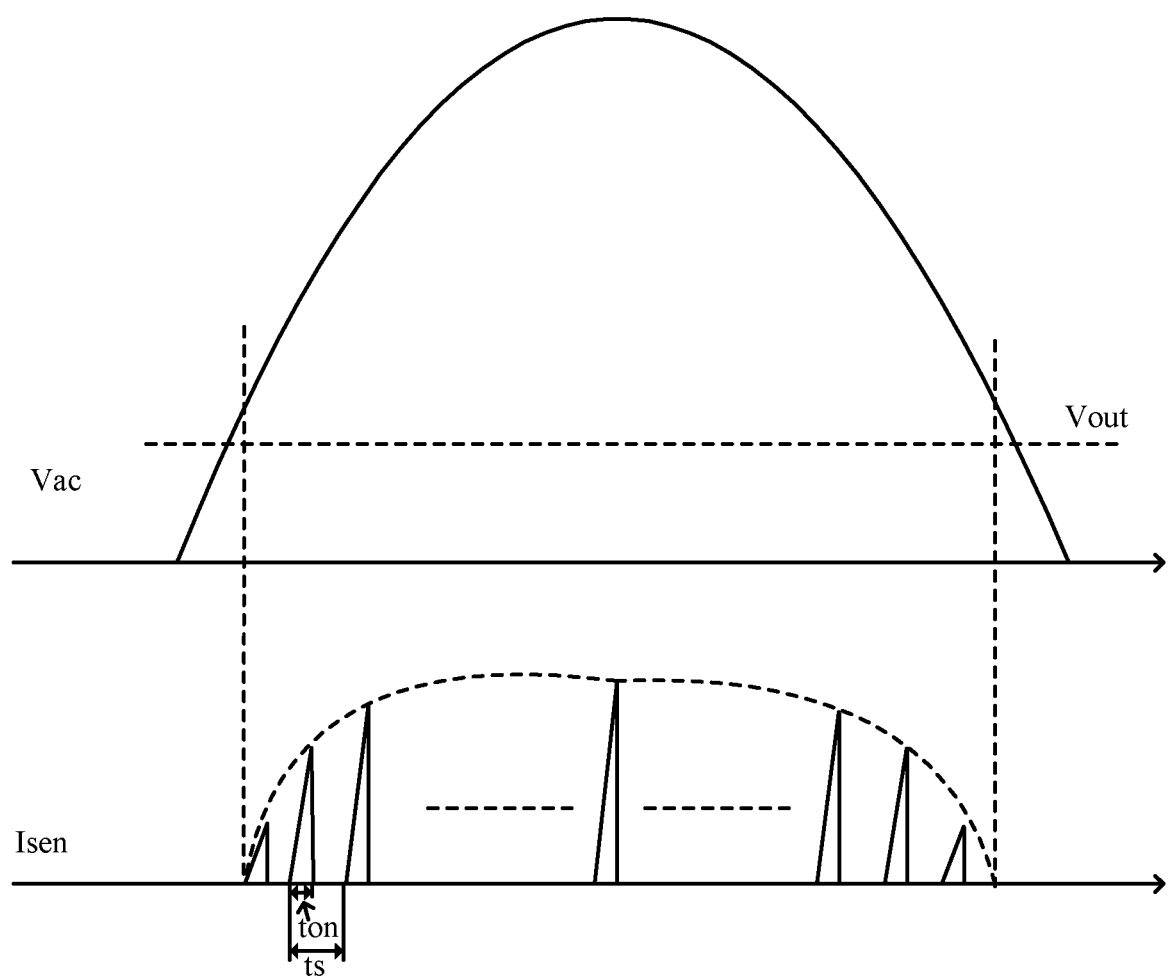
FIG. 2 shown is a waveform diagram of example operation of the example power factor correction circuit.

Here, Vin(t) is an input voltage of the switching power supply, Vout is an output voltage of the switching power supply, ton is the on-time of the power transistor, and Lm is the inductance of the switching power supply. In the current control mode, within a power frequency cycle, on-time ton is almost constant. To achieve low THD and high PF, input current Iin(t) must track input voltage Vin(t) linearly. However, from the above formula, input current Iin(t) does not vary linearly with input voltage Vin(t), but varies with Vin(t)/(Vin(t)+Vout) linearly. As a result, input current Iin(t) is distorted, and the waveform of input current Iin(t) is close to the shape of an elliptical half-wave, as shown in FIG. 2. Accordingly, this approach may not obtain an ideal THD.

In one embodiment, a control circuit for controlling an AC-DC power supply, can include: (i) a pulse-width modulation (PWM) signal generating circuit configured to generate a PWM signal in accordance with a reference voltage and a current sampling signal representing an inductor current flowing through an inductor of the AC-DC power supply, and to control a power stage circuit of the AC-DC power supply in accordance with the PWM signal; and (ii) a reference voltage generating circuit configured to generate the reference voltage based on an input voltage of the AC-DC power supply.

In one embodiment, a method of controlling an AC-DC power supply, can include: (i) generating a PWM signal in accordance with a reference voltage and a current sampling signal representing an inductor current flowing through an inductor of the AC-DC converter; (ii) controlling a power stage circuit of the AC-DC power supply in accordance with the PWM signal; and (iii) generating the reference voltage based on an input voltage of the AC-DC power supply.

Figure 3:
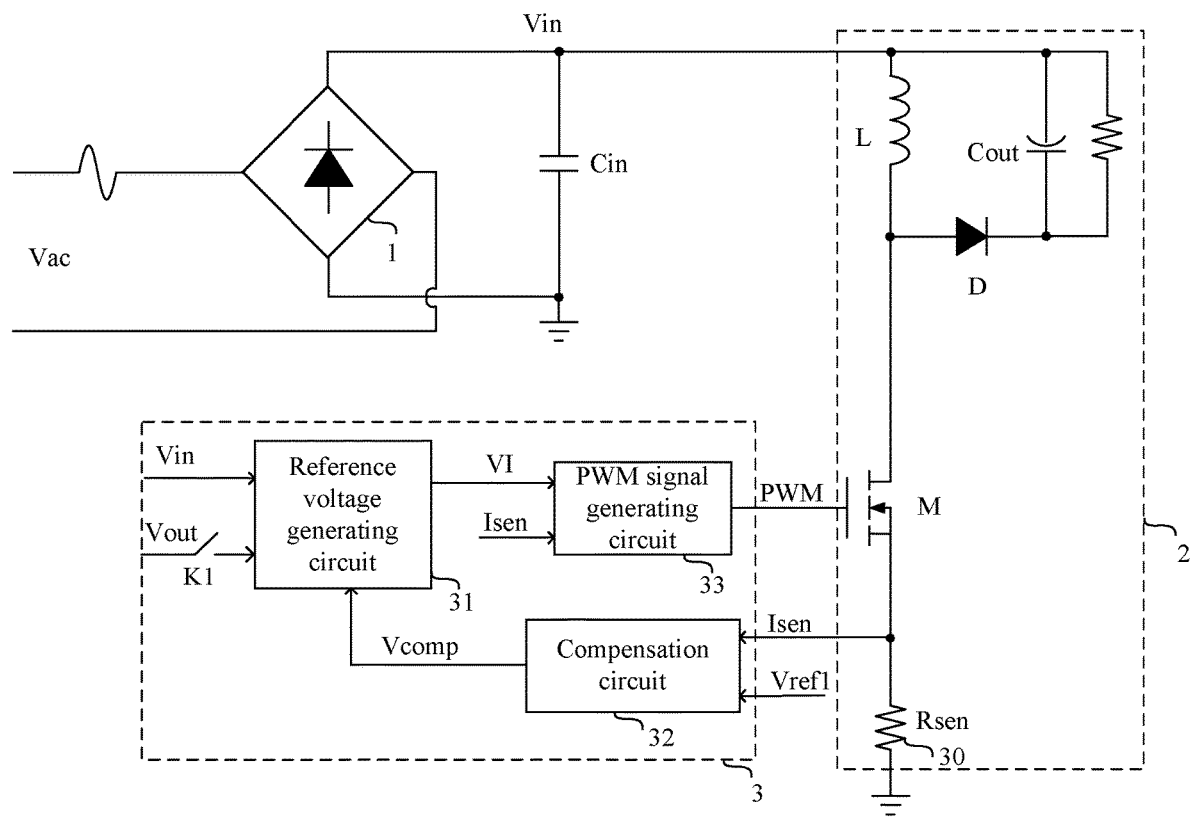
FIG. 3 shown is a schematic block diagram of an example control circuit of an AC-DC power supply, in accordance with the embodiments of this invention.

Referring now to FIG. 3, shown is a schematic block diagram of an example control circuit of AC-DC power supply, in accordance with the embodiments of this invention. This example AC-DC power supply can include rectifier circuit 1, power stage circuit 2, and control circuit 3. In this particular example, rectifier circuit 1 can receive alternating current (AC) input voltage Vac from an AC power source, and may rectify it to generate input voltage Vin. In this example, rectifier circuit 1 may be a full-bridge rectifier or a half-bridge rectifier. The AC-DC power supply can also include capacitor Cin which serve as a filter, connected across the output terminals of rectifier circuit 1. Power stage circuit 2 can include inductor (or transformer) L, power transistor M, diode D, and other components. Power stage circuit 2 can receive input voltage Vin and generate output voltage Vout. The waveform of an input current of the AC-DC power supply can be controlled to be consistent with (e.g., the same as) the waveform of the AC input voltage Vac by controlling the switching state of power transistor M, and an output current or the output voltage of power stage circuit 2 can be substantially constant.

Further, control circuit 3 can generate reference voltage VI according to input voltage Vin, and may generate a PWM signal according to reference voltage VI and current sampling signal Isen that characterizes an inductor current flowing through include inductor L. The switching state of power transistor M can be controlled according to the PWM signal, such that reference voltage VI determines the peak value of the inductor current, that, as a result, follows input voltage Vin. In this way, given that the envelope of the peak values of the inductor current is sinusoidal, the input current can be sinusoidal. It should be understood that the relationship between reference voltage VI and input voltage Vin may be determined by the topology of power stage circuit 2, such that the envelope of the peak value of the inductor current varied with input voltage Vin, and the input current may be sinusoidal.

In one embodiment, control circuit 13 can include current sampling circuit 30, reference voltage generating circuit 31, compensation circuit 32, and PWM signal generating circuit 33. Control circuit 3 can generate the PWM signal to control the switching state of power transistor M according to a feedback signal representing the output voltage or current of power stage circuit 2. Further, current sampling circuit 30 can sample the current flowing through inductor L in power stage circuit 2 to generate current sampling signal Isen. For example, current sampling signal Isen representing the inductor current can be obtained by sampling the current flowing through power transistor M. For example, current sampling circuit 30 may be configured as sampling resistor Rsen connected between one end of power transistor M and the ground terminal. It should be understood that current sampling circuit 30 can also be implemented by selecting other conventional technical solutions, or can be connected to other suitable nodes of the circuit, as long as the inductor current can be obtained.

In addition, reference voltage generating circuit 31 can generate reference voltage VI according to input voltage Vin of power stage circuit 2. Reference voltage VI can be used as a reference for the peak value of the inductor current, such that the peak value of the inductor current changes with reference voltage VI. In addition, reference voltage generating circuit 31 can also generate reference voltage VI according to compensation signal Vcomp. For example, the relationship between reference voltage VI and input voltage Vin and output voltage Vout can be determined based on the topology structure of power stage circuit 2. In one example, power stage circuit 2 can be configured as a flyback or buck-boost power converter, and reference voltage generating circuit 31 can generate reference voltage VI based on input voltage Vin and output voltage Vout of power stage circuit 2. In addition, reference voltage VI can be proportional to input voltage Vin, and may also be proportional to the sum of input voltage Vin and output voltage Vout.

Figure 4:
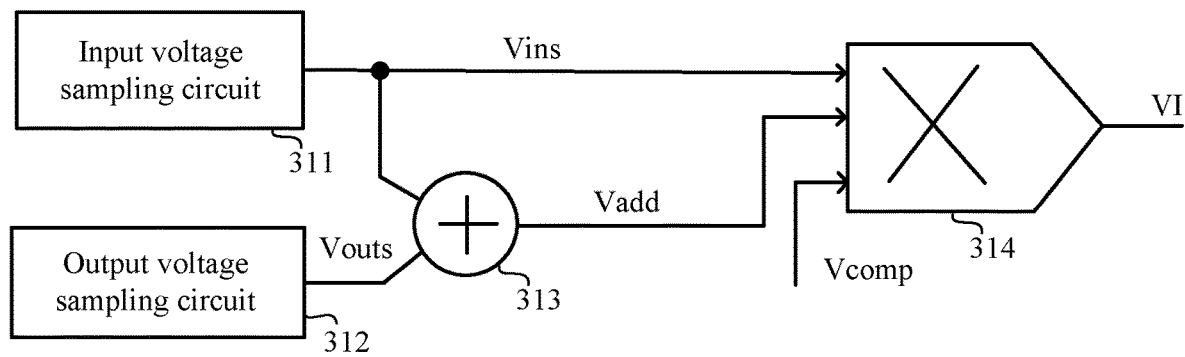
FIG. 4 shown is a schematic block diagram of a first example reference voltage generating circuit, in accordance with embodiments of the present invention.

Referring now to FIG. 4, shown is a schematic block diagram of a first example reference voltage generating circuit, in accordance with the embodiments of this invention. This example reference voltage generating circuit 31 can include input voltage sampling circuit 311, output voltage sampling circuit 312, and adder 313. In this particular example, input voltage sampling circuit 311 can sample instantaneous value Vin(t) of input voltage Vin to generate input voltage sampling signal Vins. Here, the sampling coefficient can be selected as k so that Vins=k*Vin(t), and k is a constant. Output voltage sampling circuit 312 can obtain the average value of output voltage Vout, in order to generate output voltage sampling signal Vouts.

Adder 313 can superimpose input voltage sampling signal Vins and output voltage sampling signal Vouts to generate superimposed signal Vadd. Here, output voltage sampling signal Vouts can be equal to k*Vout selectively, where the sampling coefficient of input voltage Vin can be also selected as k. When the sampling coefficient is consistent with the sampling coefficient of output voltage Vout, adder 313 can directly generate superimposed signal Vadd without any scaling process, and superimposed signal Vadd may be expressed as: Vadd=k*(Vin(t)+Vout). In addition, reference voltage generating circuit 31 can further include multiplication circuit 314 for multiplying input voltage sampling signal Vins, superimposed signal Vadd, and compensation signal Vcomp to generate reference voltage VI. Here, reference voltage VI can be expressed as: VI=k2*Vin(t)*(Vin(t)+Vout)*Vcomp.

Since the open-loop bandwidth of the overall control loop determined by a frequency compensation network located inside the control circuit is narrow enough, compensation signal Vcomp can be regarded as a DC level. In this way, reference voltage VI determines the peak value of the inductor current, that, as a result, follows input voltage Vin. For example, multiplication circuit 314 can included two multipliers. The first multiplier can multiply two of the three parameters of sampling signal Vins, superimposed signal Vadd, and compensation signal Vcomp, and the other multiplier can multiply the result of the first multiplier and the rest parameter to obtain reference voltage VI. In this example, power stage circuit 2 can be a flyback or buck-boost power converter, and when the peak value of the inductor current varied with reference voltage VI, instantaneous value Iin(t) of input current Iin can be expressed as formula (2):

$$Iin(t) = \frac{Ipk}{2} \cdot \frac{ton}{ts} \qquad (2)$$

$$= \frac{k^2 \cdot \text{Vin}(t) \cdot (\text{Vin}(t) + \text{Vout})}{2} \cdot \frac{\text{Vout}}{(\text{Vin}(t) + \text{Vout})}$$

$$= \frac{k^2 \cdot \text{Vin}(t) \cdot \text{Vout}}{2}$$

Here, Ipk is the peak value of the inductor current. Since coefficient k is constant, and output voltage Vout fluctuates relatively little, input current Iin is essentially in a linear relationship with input voltage Vin. Further, instantaneous value Iin(t) of input current Iin is essentially linear with instantaneous value Vin(t) of input voltage Vin, which indicates that the waveform of input current Iin is consistent with the waveform of input voltage Vin essentially, such that a lower THD is obtained while obtaining a higher PF.

In this example, compensation signal Vcomp may be generated by compensation circuit 32. For example, compensation circuit 32 can generate compensation signal Vcomp based on a feedback signal of power stage circuit 2. In one example, compensation circuit 32 may amplifier the difference between current sampling signal Isen and current reference signal Vref1 to generate compensation signal Vcomp. Further, compensation circuit 32 can include a transconductance amplifier and a capacitor connected between the output terminal of the transconductance amplifier and the ground terminal. The transconductance amplifier has a first terminal for receiving current sampling signal Isen and a second terminal for receiving current reference voltage Vref1.

The transconductance amplifier charges or draws current to the capacitor based on the difference between current sampling signal Isen and current reference voltage Vref1, such that the voltage across the capacitor as compensation signal Vcomp can represent the difference between current sampling signal Isen and current reference voltage Vref1. It should be understood that compensation circuit 32 can also be implemented by other circuits or components, such as a differential amplifier circuit. In another example, a constant output voltage is required, compensation circuit 32 may amplify the difference between feedback signal Vfb of the output voltage and reference voltage Vref2 representing a desired output voltage to generate to generate compensation signal Vcomp. In this way, compensation signal Vcomp can represent the difference between feedback signal Vfb and reference voltage Vref2.

Figure 5:
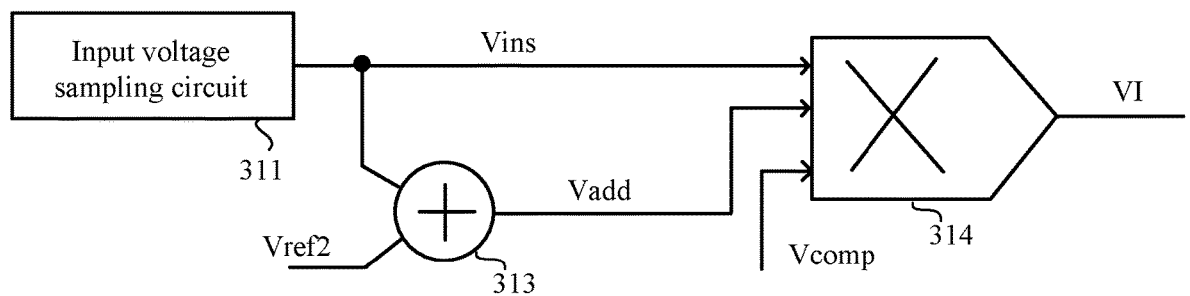
FIG. 5 shown is a schematic block diagram of a second example reference voltage generating circuit, in accordance with embodiments of the present invention.

Referring now to FIG. 5, shown is a schematic block diagram of a second example reference voltage generating circuit, in accordance with the embodiments of this invention. This example reference voltage generating circuit 31 can include input voltage sampling circuit 311 and adder 313. In this particular example, input voltage sampling circuit 311 can sample instantaneous value Vin(t) of input voltage Vin to generate input voltage sampling signal Vins. Here, the sampling coefficient can be selected as k so that Vins=k*Vin(t), and k is a constant. Adder 313 can superimpose input voltage sampling signal Vins and voltage reference signal Vref2 representing output voltage Vout to generate superimposed signal Vadd. Here, voltage reference signal Vref2 can be equal to k*Vout selectively, where the voltage sampling coefficient can be also selected as k.

When the sampling coefficient of input voltage Vin is consistent with the sampling coefficient of output voltage Vout, adder 313 can directly generate superimposed signal Vadd without any scaling process, and superimposed signal Vadd can be expressed as: Vadd=k*(Vin(t)+Vout). In addition, reference voltage generating circuit 31 can also include multiplication circuit 314 for multiplying input voltage sampling signal Vins, superimposed signal Vadd, and compensation signal Vcomp to generate reference voltage VI. Here, reference voltage VI can be expressed as: VI=$k^2$*Vin(t)*(Vin(t)+Vout)*Vcomp. Since the open-loop bandwidth of the overall control loop determined by a frequency compensation network located inside the control circuit is narrow enough, compensation signal Vcomp can be regarded as a DC level. In this way, reference voltage VI can determine the peak value of the inductor current, that, as a result, follows input voltage Vin.

Figure 6:
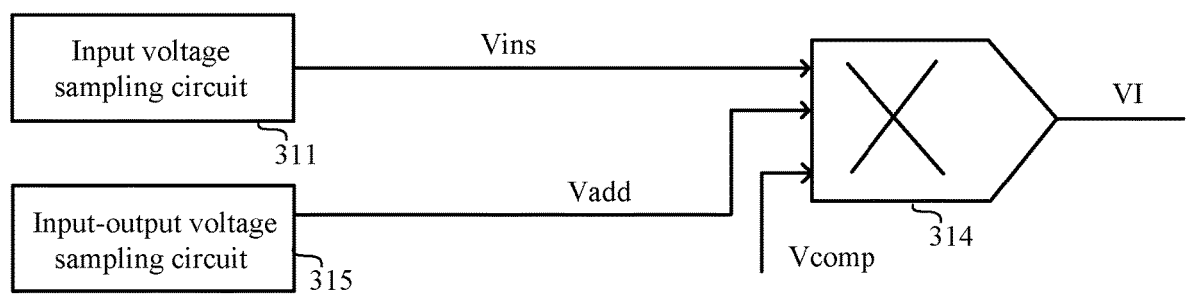
FIG. 6 shown is a schematic block diagram of a third example reference voltage generating circuit, in accordance with embodiments of the present invention.

Referring now to FIG. 6, shown is a schematic block diagram of a third example reference voltage generating circuit, in accordance with the embodiments of this invention. In this particular example, reference voltage generating circuit 31 can include input voltage sampling circuit 311 and input-output voltage sampling circuit 315. As shown, input voltage sampling circuit 311 can sample instantaneous value Vin(t) of input voltage Vin to generate input voltage sampling signal Vins. Here, the sampling coefficient can be selected as k so that Vins=k*Vin(t), and k is a constant. Input-output voltage sampling circuit 315 can obtain the sum of input voltage Vin and output voltage Vout to generate superimposed signal Vadd. Here, superimposed signal Vadd can be expressed as: Vadd=k*(Vin(t)+Vout). In addition, reference voltage generating circuit 31 can also include multiplication circuit 314 for multiplying input voltage sampling signal Vins, superimposed signal Vadd, and compensation signal Vcomp to generate reference voltage VI. Here, reference voltage VI can be expressed as: VI=$k^2$*Vin(t)*(Vin(t)+Vout)*Vcomp. Since the open-loop bandwidth of the overall control loop determined by a frequency compensation network located inside the control circuit is narrow enough, compensation signal Vcomp can be regarded as a DC level. In this way, reference voltage VI may determine the peak value of the inductor current, that, as a result, follows input voltage Vin.

Figure 7:
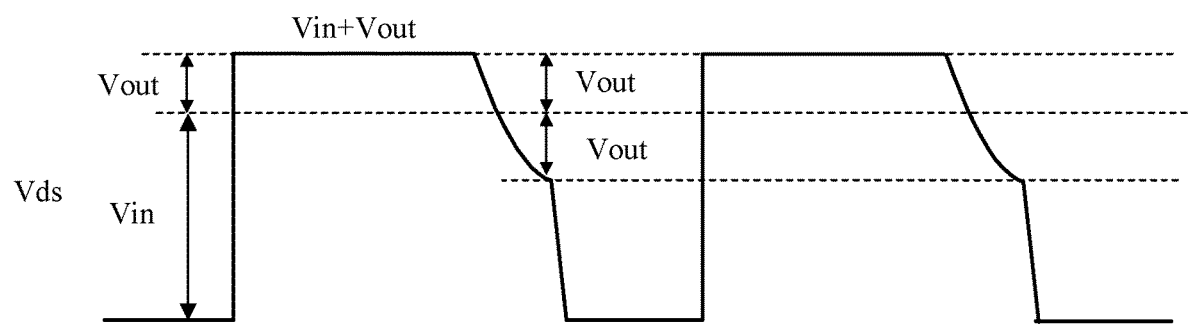
FIG. 7 shown is a waveform diagram of a first example operation of the AC-DC power supply, in accordance with the embodiments of this invention.

Referring now to FIG. 7, shown is a waveform diagram of a first example operation of the AC-DC power supply, in accordance with the embodiments of this invention. In this example, power stage circuit 2 can be a flyback or buck-boost power converter. When power transistor M of power stage circuit 2 is turned off, voltage Vds across two power terminals of power transistor M is equal to the sum of input instantaneous value Vin(t) of the input voltage and output voltage Vout, and when power transistor M is turned on, voltage Vds across power transistor M is equal to zero. Therefore, input-output voltage sampling circuit 315 can obtain superimposed signal Vadd by sampling voltage Vds across power transistor M during the off period of power transistor M. In another example, if power stage circuit 2 is a buck power converter, reference voltage generating circuit 31 can generate reference voltage VI according to input voltage Vin of power stage circuit 2, and reference voltage VI may be proportional to the square of input voltage Vin.

Figure 8:
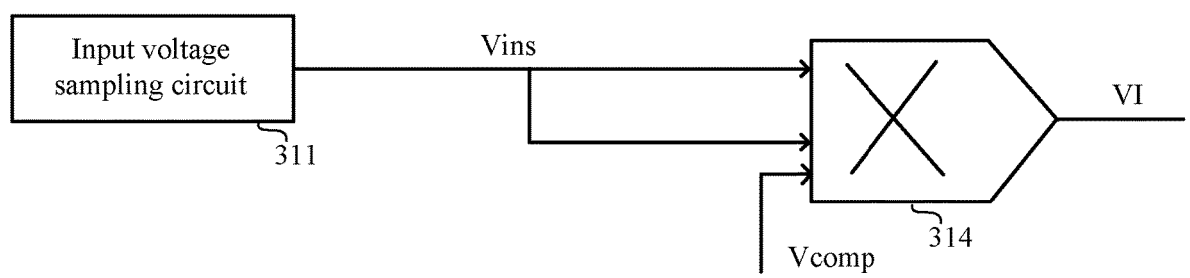
FIG. 8 shown is a schematic block diagram of a fourth example reference voltage generating circuit, in accordance with the embodiments of this invention.

Referring now to FIG. 8, shown is a schematic block diagram of a fourth example reference voltage generating circuit, in accordance with the embodiments of this invention. In this particular example, reference voltage generating circuit 31 can include input voltage sampling circuit 311 and multiplication circuit 314. As shown, input voltage sampling circuit 311 can sample instantaneous value Vin(t) of input voltage Vin to generate input voltage sampling signal Vins. Here, the sampling coefficient can be selected as k so that Vins=k*Vin(t), and k is a constant. Multiplication circuit 314 can multiply the square of input voltage sampling signal Vins and compensation signal Vcomp to generate reference voltage VI. Here, reference voltage VI can be expressed as: VI=(k* Vin(t))²*Vcomp.

For example, multiplication circuit 314 can included two multipliers. The first multiplier can multiply two of the three parameters of input voltage sampling signal Vins, input voltage sampling signal Vins and compensation signal Vcomp, and the other multiplier can multiply the result of the first multiplier and the rest parameter to obtain reference voltage VI. In this example, power stage circuit 2 can be a buck power converter, and when the peak value of the inductor current varied with reference voltage VI, instantaneous value Iin(t) of input current Iin can be expressed as below in formula (3):

$$Iin(t) = \frac{Ipk}{2} \cdot \frac{ton}{ts} \quad (3)$$
$$= \frac{(k \cdot Vin(t))^2}{2} \cdot \frac{Vout}{Vin(t)}$$
$$= \frac{k^2 \cdot Vin(t) \cdot Vout}{2}$$

Here, Ipk is the peak value of the inductor current. Since coefficient k is constant, and output voltage Vout fluctuates relatively little, input current Iin is essentially in a linear relationship with input voltage Vin. Further, instantaneous value Iin(t) of input current Iin is essentially linear with instantaneous value Vin(t) of input voltage Vin, which indicates that the waveform of input current Iin is consistent with the waveform of input voltage Vin essentially, such that a lower THD is obtained while obtaining a higher PF.

Figure 9:
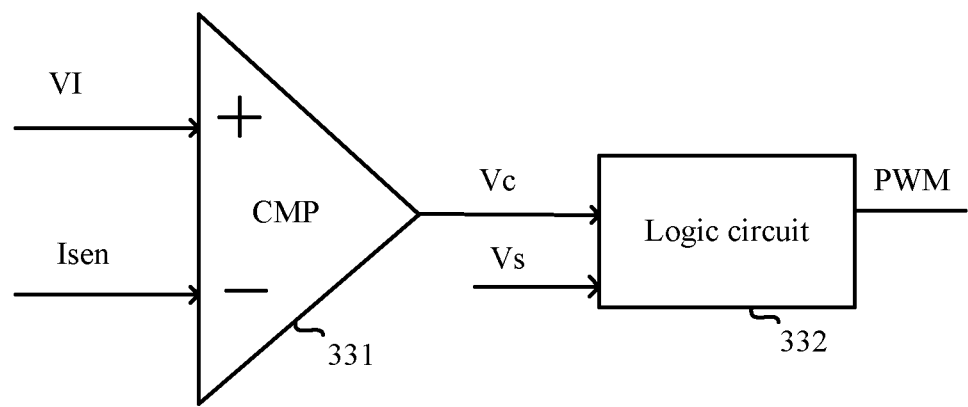
FIG. 9 shown is a schematic block diagram of an example PWM signal generating circuit, in accordance with the embodiments of this invention.

Referring now to FIG. 9, shown is a schematic block diagram of an example PWM signal generating circuit, in accordance with the embodiments of this invention. This example PWM signal generating circuit 33 can generate a PWM signal according to reference voltage VI and current sampling signal Isen, such that the peak value of the inductor current changes with reference voltage VI. PWM signal generating circuit 33 can include comparator 331 and logic circuit 332. The non-inverting input terminal of comparator 331 can receive reference voltage VI, the inverting input terminal of comparator 331 can receive current sampling signal Isen, and the output terminal of comparator 331 can generate comparison signal Vc. Logic circuit 332 can receive comparison signal Vc as a reset signal, and a signal representing that the inductor current crosses zero when power transistor M is turned off as a set signal, in order to generate a PWM signal. For example, when the signal representing that the inductor current crosses zero is active, logic circuit 332 can control power transistor M to turn on based on the PWM signal, and when comparison signal Vc is active, logic circuit 332 can control power transistor M to turn off based on the PWM signal.

Figure 10:
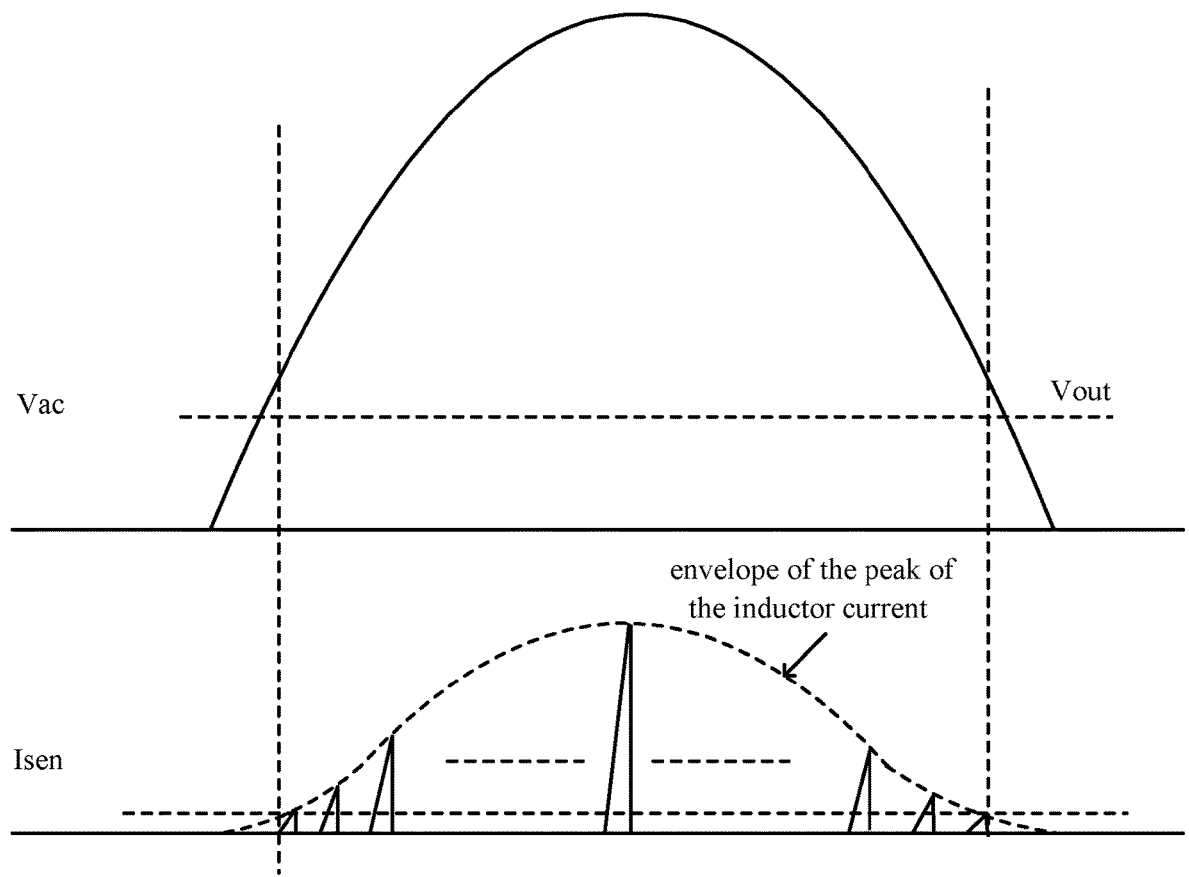
FIG. 10, shown is a waveform diagram of a second example operation of the AC-DC power supply, in accordance with the embodiments of this invention.

Referring now to FIG. 10, shown is a waveform diagram of a second example operation of the AC-DC power supply, in accordance with the embodiments of this invention. In this example, power stage circuit 2 may be a flyback or buck-boost power converter. The input current is the average of the inductor current, which flows both during the on-time and off-time of power transistor M. As a result, being a series of discontinuous triangles, the average value of the inductor current is half the peak. Also, given that the envelope of the peaks of the inductor current is sinusoidal, the input current is sinusoidal.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for controlling an AC-DC power supply, the control circuit comprising:
   a) a pulse-width modulation (PWM) signal generating circuit configured to generate a PWM signal in accordance with a reference voltage and a current sampling signal representing an inductor current flowing through an inductor of the AC-DC power supply, and to control a power stage circuit of the AC-DC power supply in accordance with the PWM signal; and
   b) a reference voltage generating circuit configured to generate the reference voltage based on an input voltage of the AC-DC power supply, wherein a corresponding relationship between the reference voltage and the input voltage is determined in accordance with a topology of the power stage circuit, such that an envelope of peak values of the inductor current varies sinusoidally with the input voltage,
   c) wherein the reference voltage is proportional to a product of the input voltage, a sum of the input voltage and an output voltage of the AC-DC power supply, and a compensation signal, or the reference voltage is proportional to a product of a square of the input voltage and the compensation signal.

2. The control circuit of claim 1, wherein the reference voltage generating circuit receives an output voltage of the AC-DC power supply via a switch.

3. The control circuit of claim 1, wherein a topology of the power stage circuit is configured as a flyback or a buck-boost circuit.

4. The control circuit of claim 1, wherein a topology of the power stage circuit is configured as a buck power circuit.

5. The control circuit of claim 1, wherein the reference voltage generating circuit comprises a multiplication circuit having a first input terminal for receiving an input voltage sampling signal of the input voltage, a second input terminal for receiving a second signal, and an output terminal for generating the reference voltage.

6. The control circuit of claim 5, wherein the reference voltage generating circuit comprises an input voltage sampling circuit configured to provide the input voltage sampling signal, and the second signal is configured to be the input voltage sampling signal.

7. The control circuit of claim 5, wherein the reference voltage generating circuit comprises an adder configured to superimpose the input voltage sampling signal and an output voltage sampling signal of an output voltage to generate a superimposed signal, and the second signal is configured to be the superimposed signal.

8. The control circuit of claim 5, wherein the reference voltage generating circuit comprises an input-output voltage sampling circuit configured to generate a superimposed signal representing a sum of the input voltage and an output voltage of the AC-DC power supply, and the second signal is configured to be the superimposed signal.

9. The control circuit of claim 8, wherein the input-output voltage sampling circuit is configured to sample a voltage between two power terminals of a power transistor of the power stage circuit to generate the superimposed signal while the power transistor is turned off.

10. The control circuit of claim 5, wherein the reference voltage generating circuit comprises an adder configured to superimpose the input voltage sampling signal and a reference signal representing an output voltage of the AC-DC power supply to generate a superimposed signal, and the second signal is configured to be the superimposed signal.

11. The control circuit of claim 5, wherein the multiplication circuit has a third input terminal for receiving a compensation signal.

12. A method of controlling an AC-DC power supply, the method comprising:
 a) generating a pulse-width modulation (PWM) signal in accordance with a reference voltage and a current sampling signal representing an inductor current flowing through an inductor of the AC-DC power supply;
 b) controlling a power stage circuit of the AC-DC power supply in accordance with the PWM signal; and
 c) generating the reference voltage based on an input voltage of the AC-DC power supply, wherein a corresponding relationship between the reference voltage and the input voltage is determined in accordance with a topology of the power stage circuit, such that an envelope of peak values of the inductor current varies sinusoidally with the input voltage,
 d) wherein the reference voltage is proportional to a product of the input voltage, a sum of the input voltage and an output voltage of the AC-DC power supply, and a compensation signal, or the reference voltage is proportional to a product of a square of the input voltage and the compensation signal.

13. The method of claim 12, wherein the reference voltage generating circuit receives an output voltage of the AC-DC power supply via a switch.

14. The method of claim 12, wherein a topology of the power stage circuit is configured as a flyback or a buck-boost circuit.

15. The method of claim 12, wherein a topology of the power stage circuit is configured as a buck power circuit.

16. The method of claim 12, further comprising:
 a) generating an input voltage sampling signal of the input voltage;
 b) generating a square of the input voltage sampling signal; and
 c) generating the reference voltage based the square of the input voltage sampling signal.

17. The method of claim 12, further comprising:
 a) generating a superimposed signal based on a sum of an input voltage sampling signal of the input voltage and an output voltage sampling signal of an output voltage of the AC-DC power supply;
 b) generating a product of the input voltage sampling signal and the superimposed signal; and
 c) generating the reference voltage based on the product.

18. The method of claim 12, further comprising:
 a) generating a superimposed signal representing a sum of the input voltage and an output voltage of the AC-DC power supply;
 b) generating a product of an input voltage sampling signal of the input voltage and the superimposed signal; and
 c) generating the reference voltage based on the product, wherein the superimposed signal is generated by sampling a voltage between two power terminals of a power transistor of the power stage circuit while the power transistor is turned off.

\* \* \* \* \*